L7-209 SEARCH RC

Sept. 7, 1965 P. G. STEWART Re. 25,850

VARIABLE VOLUME HYDRAULIC PUMP Orig. 2997,956

Original Filed Aug. 18, 1958 3 Sheets-Sheet 1

INVENTOR.
PHILLIP G. STEWART
BY
Lieber, Lieber & Nilles
ATTORNEYS

VARIABLE VOLUME HYDRAULIC PUMP

Original Filed Aug. 18, 1958 3 Sheets-Sheet 2

INVENTOR.
PHILLIP G. STEWART
BY
Lieber, Lieber & Nilles
ATTORNEYS

VARIABLE VOLUME HYDRAULIC PUMP

Original Filed Aug. 18, 1958 3 Sheets-Sheet 3

INVENTOR.
PHILLIP G. STEWART
BY
Lieber, Lieber & Nilles
ATTORNEYS

United States Patent Office

Re. 25,850
Reissued Sept. 7, 1965

25,850

VARIABLE VOLUME HYDRAULIC PUMP

Phillip G. Stewart, Oak Park, Mich., assignor, by mesne assignments, to Applied Power Industries, Inc., a corporation of Wisconsin Original No. 2,997,956, dated Aug. 29, 1961, Ser. No. 755,659, Aug. 18, 1958. Application for reissue July 23, 1963, Ser. No. 297,988
11 Claims. (Cl. 103—41)

Matter enclosed in heavy brackets [ ] appears in the original patent but forms no part of this reissue specification; matter printed in italics indicates the additions made by reissue.

This invention relates to hydraulic pumps of the type having multiple pumping plungers which are alternately reciprocated by an eccentric wobble plate. The invention finds particular utility in a pump of this type which has the pistons in axial parallelism and in which the wobble plate is rotated. More particularly, the invention pertains to such a pump having by-pass means for the pumping units by which the volume of the pump may be readily varied.

Prior art pumps of this general type have been proposed wherein the by-pass fluid is used primarily to lubricate the moving parts of the pump. These have been rather complicated arrangements utilizing sliding sleeves actuated by shiftable spiders and have presented leakage problems resulting in an inefficient pump.

In accordance with the present invention, a multiple piston hydraulic pump has been provided which has an improved adjustment means for actuating by-pass valves and thereby readily varying the volumetric output of the pump. The invention further provides that this by-pass means may function as an auxiliary inlet when not functioning to by-pass fluid, thereby contributing to an increase in pump efficiency.

The invention further contemplates novel adjusting means by which the amount of fluid diverted by the by-pass means can be readily controlled. The arrangement is such that the fluid can be by-passed at a nominal pressure for any delivery rate.

The by-pass means and its adjustment are so timed in their functioning so as not to interfere with the positive opening of the inlet check valves in the pistons and at the proper time during their operating cycle.

The adjustable controlling means for the by-pass valves comprises an eccentric member carried by an axially shiftable shaft, the phase of said eccentric in respect to the wobble plate being changeable by said axial movement of the shaft. The result is a quickly adjustable flow control means.

These and other objects and advantages will appear hereinafter as this disclosure progresses, reference being had to the accompanying drawings in which.

Figure 1:
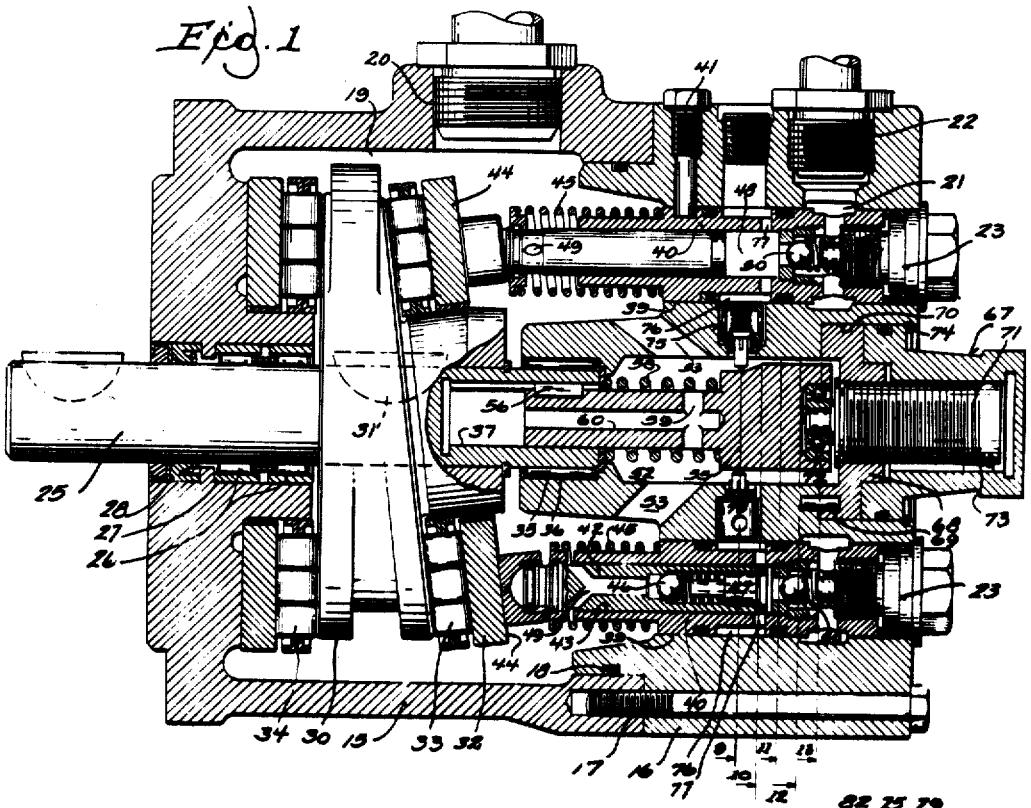
FIGURE 1 is an axial cross-sectional view of a pump embodying the invention.
Figure 2:
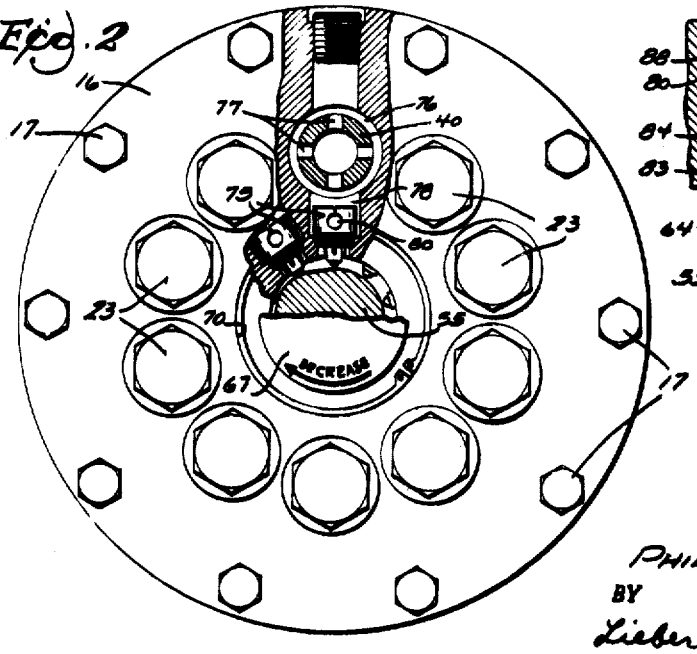
FIGURE 2 is an end view of the pump of FIGURE 1, certain parts broken away and in section for clarity of the drawings.

Referring in greater detail to the drawings, and particularly to FIGURE 1, the pump housing includes a drive housing 15 having a cylinder barrel housing 16 secured thereto by cap bolts 17 with an oil ring seal 18 therebetween. Fluid is furnished to the pump intake chamber 19 through the inlet opening 20. A common annular discharge passage 21 is formed in the cylinder housing 16 through which pressure fluid is discharged into the main outlet port 22. Isolating plugs 23 are removable, if desired, and a portion of the pressure fluid may be diverted to separate sources of utilization through conduits (not shown) insertable in place of any of the isolating plugs. For a more complete description of these plugs and their functions, reference may be had, if desired, to the co-pending U.S. application of David T. Blair, Serial Number 661,334, filed May 24, 1957, issued on June 21, 1960, as Patent No. 2,941,475, and entitled "Hydraulic Pump," said application being assigned to the assignee of the present application.

A drive shaft 25 is mounted on anti-friction bearings 26 in the bore 27 of the drive housing and has a conventional shaft seal 28 thereon. A wobble plate 30 is fixed to shaft 25 by key 31 and carries a thrust absorbing bearing plate 32 on the anti-friction bearing assembly 33. Another thrust bearing assembly 34 is mounted behind the swash plate 30. The inner end of the drive shaft is piloted on the anti-friction bearings 35 which are mounted in the bore 36 of the cylinder housing. The inner end of the drive shaft has a bore 37 therein for purposes that will appear hereinafter.

The cylinder housing has a plurality of circumferentially spaced bores 39 in each of which is fixed the cylinder cartridges 40 by means of pins 41. A piston 42 is reciprocated within each of the bores 43 of the cartridges to effect suction and discharge strokes. A pumping stroke (to the right as viewed in FIGURE 1) is delivered to the piston by the rotating eccentric surface 44 of the swash plate assembly. A spring 45 urges the piston to the left and against the surface 44 as the suction ramp of the swash plate 32 passes by.

For a more complete description of the cylinder cartridges 40, the piston inlet check valves 46 and their spacers 47, reference may be had if deemed necessary, to the co-pending U.S. application of William R. Leisner, Serial Number 685,441, filed September 23, 1957, issued on July 19, 1960, as Patent No. 2,945,444, and entitled, "Hydraulic Pump," which has also been assigned to the assignee of the present application. It is believed sufficient to say, however, for purposes of this disclosure, that fluid is supplied to the pumping chamber 48 through the bores 49 extending through the piston, past ball check 46 and through spacer 47. Thus the inlet chamber 19 and bores 49 form an inlet passageway for supply fluid. The ball 46 is unseated when the piston begins its suction stroke (left as viewed in FIGURE 1) and it is desirable to have the ball 46 unseat before fluid is admitted to the pumping chambers via other inlets as will later become more apparent. It is important for efficient operation of the pump that a steady and turbulent-free flow of fluid passes into the pumping chamber. Pressure fluid is discharged during the pumping stroke of the piston through the outlet check valves 50 and into the discharge chamber 21.

The cylinder housing 16 also has a chamber 52 which is in fluid communication with the inlet chamber via cross bores 53. A cam member 55 is mounted in the bore 37 of the drive shaft and extends into the chamber 52. The member 55 is fastened by key 56 to the drive shaft 25 for rotation therewith but is axially movable the respect to the driveshaft within the bore 37. A spring 58 surrounds part of member 55 and urges the latter to the right as viewed in FIGURE 1. A cross bore 59 and connecting bore 60 place chamber 52 in fluid communication with the bottom end of bore 37 to prevent any build-up of pressure therein which would cause malfunction of the control means to be described.

Figure 4:
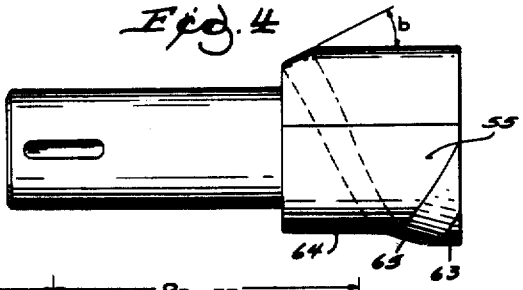
FIGURE 4 is a side view of the adjusting cam as shown in FIGURE 1, but on an enlarged scale.

The cam member 55 also includes an enlarged cam portion comprising a major diameter 63 and a minor diameter 64 which are connected by the inclined portion 65 extending in spiral fashion around the cam. The shape between the various cam surfaces 63, 64 and 65 along an axial line on the cam periphery are in the nature of simple harmonics, and the angle b of the inclined surface 65, as shown in FIGURE 4 for purposes of illustration, is 30 degrees with respect to the cam axis. This particular angle has been found satisfactory for smooth operation of the cam and the valves actuated thereby, but should not be interpreted as limiting the invention to any particular angle of this inclined surface. It does, however, provide a gradual transition of direction of movement for the cam follower to be described.

The cam member can be shifted in an axial direction to any one of a plurality of positions in order to vary the amount of fluid which is by-passed by means to be presently described. By so adjusting the axial position of the cam, the pumping pistons discharge pressure fluid to the outlet chamber 21 through only a predeterminable portion of their stroke.

This axial adjustment of the cam is shown as being by a manually operated knob 67 which extends from the end of the pump, although suitable automatic actuating devices, particularly of the hydraulically operated type, may be employed for this purpose. A large nut 68 is fixed by pin 69 within the large counterbore 70 in the end of the housing. The nut threadably engages the shaft 71 which is piloted in anti-friction bearing assembly 72 in the cam member. The shaft 71 is fastened to knob 67 by the key 73 which causes the shaft to rotate with the knob, but permits axial shifting therebetween. A snap ring 74 rotatably holds the knob in the bore 70. Thus as the knob is turned in either direction, the cam member is shifted axially in a corresponding direction to either cause more fluid to be by-passed back to the inlet supply or discharged as follows.

Figure 3:
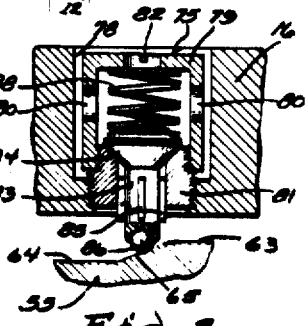
FIGURE 3 is an enlarged fragmentary view, in section, of one of the by-pass check valves.
Figure 5:
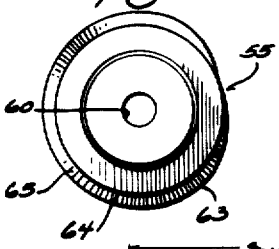
FIGURE 5 is an end view of the adjusting cam shown in FIGURE 4.

A by-pass check valve assembly 75, shown in enlarged detail in FIGURE 3, is mounted in the housing 16 between each of the pumping chambers 48 and the central chamber 52, the latter communicating with the inlet chamber 19 via passages 53. More particularly, annular groove 76 around the periphery of cylinder cartridges 40 together with their connecting cross bores 77 place the by-pass valve bore 78 in fluid communication with the pumping chambers 48.

The valve assembly 75 comprises a cap 79 having ports 80 in three of its sides. A valve seat plug 81 is threaded into the cap 79 and also into the housing 16. A slot 82 is formed in the outer end of the assembly to receive a tool for inserting and removing the assembly. A valve surface 84 which sealingly engages a complementary tapered bore in the plug. Circumferentially spaced guides 85 of the element 83 keep the latter centered in the bore of the element 83 keep the latter centered in the bore of the plug and insure proper seating of the valve element. A hardened ball 86 is carried in the inner end of the valve element and acts as a cam follower in following the contour of the cam.

Figure 8:
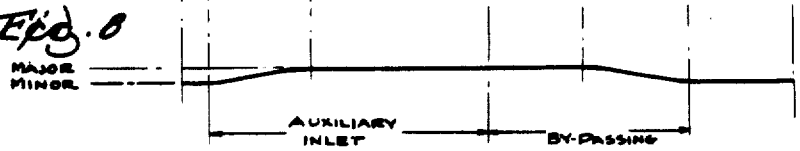
FIGURE 8 is a projection from FIG. 7 and showing the path of the by-pass valve travel when the pump is operating at one-quarter stroke.

When the ball 86 is on the major diameter 63 of the cam, the valve surface 84 is held off its seat to permit fluid to by-pass from the pumping chambers 48 to the inlet chamber 19. When the ball is on the minor diameter, the spring 88 holds the valve element seated in sealing engagement with the plug 81 in which case all of the pressure fluid being pumped by the pistons is deliver to the discharge passage 21. In moving from one diameter of the cam to the other, the ball rides on the inclined surface 65, and its transition is in a harmonic motion as shown in FIGURE 8.

Figures 9, 10, 11, 12, 13:
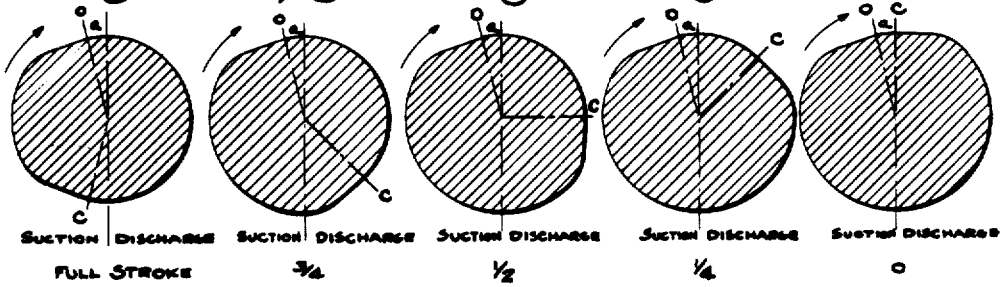
FIGURES 9–13 are cross-sectional views of the cam, taken on lines 9—9 to 13—13, respectively, in FIGURE 1, but on an enlarged scale, and showing, respectively, the paths travelled by the by-pass check valve when the pump is operating at full, three-fourths, one-half, one-fourth and zero strokes.
Figure 6:
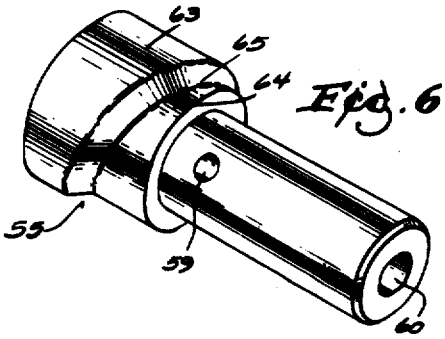
FIGURE 6 is a perspective view of the cam member shown in FIGURES 4 and 5.

FIGURES 9 to 13 are cross-sectional views of the cam taken on lines 9—9 to 13—13, respectively, in FIGURE 1. FIGURE 9 represents that portion of the cam which results in a full discharge stroke of the piston, that is, the piston discharges its entire pumping capacity during the full 180 degrees rotation of the wobble plate, and during which no pressure fluid is by-passed via valve assemblies 75.

It will be noted that in each of FIGURES 9–13, a lag of about 15 degrees, indicated by the letter a, is provided after piston leaves the top dead center position. The curvilinear arrows of FIGURES 9–13 indicate the direction of rotation of the cam. This lag insures that the by-pass valves are held shut and are ineffective to act as auxiliary inlets for the pumping chambers until after the piston inlet valves 46 have been opened fully at the beginning of the suction stroke of the pistons. This synchronization of the by-pass and piston inlet valves is insured by the fact that the wobble plate and the cam member are both fixed to the driveshaft for rotation as a unit. As a result, they cannot get out of phase with one another. The portion of the cam to the left of the vertical centerline in FIGURES 9–13 represents the suction portion of the cam which corresponds to the suction ramp of the wobble plate.

The dotted lines O and C in FIGURES 9–13 represent the opening and closing positions of the by-pass valves. Thus FIGURE 10 represents the cam position where the piston is discharging its pressure fluid to the discharge passage 21 for three-fourths of its discharge stroke. FIGURES 11, 12 and 13 similarly represent one-half, one-quarter, and zero pumping strokes of the pistons. In any of the positions where the by-pass valve is open during the discharge stroke, as in FIGURES 10–13, it will be noted that the by-pass valve is open under action of the cam at the beginning of the discharge stroke. As a result, any by-passing of fluid that takes place occurs at nominal pressure, that is, before pressure builds up in the chambers 48.

The by-pass valves 75 also act as auxiliary fluid inlets for the pumping chambers 48. As previously mentioned, however, this auxiliary inlet feature does not come into operation until after the piston inlet valves 46 are fully open and admitting fluid themselves. After the 15 degree lag "a" has elapsed in the initial portion of the pistons suction stroke, the cam surface 65 of the eccentric member 55 causes the ball 86 to ride up to the major diameter 63, thus opening the by-pass valves during the suction stroke of the pistons. When operating at "full stroke," as shown in FIGURE 9, the cam causes the by-pass valves to close about 15 degrees before the discharge stroke commences. In the other FIGURES 10–13, the closing of the by-pass valves is correspondingly delayed, depending on the length of the piston stroke through which it is desired to by-pass fluid.

Figure 7:
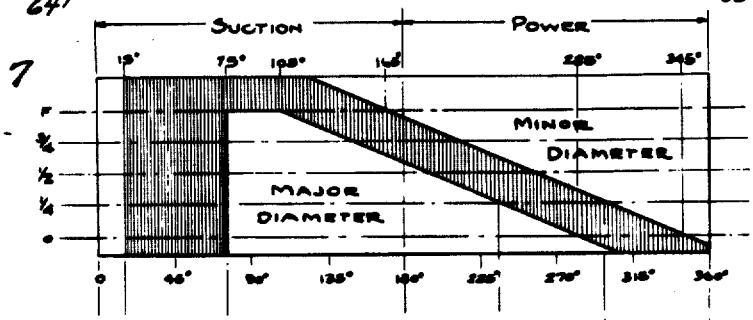
FIGURE 7 is a layout of the cam showing various pumping capacities of the pump.

FIGURE 8 shows a projection from FIGURE 7 for the one-quarter stroke position of the cam. It will be seen that the auxiliary inlet operation of the by-pass valves begin 15 degrees after the beginning of the piston suction stroke. As the piston changes from a suction to a discharge stroke the by-pass valves remain open until the last one-quarter portion of the piston discharge stroke. Then during the last quarter of the discharge stroke, the piston discharges its load under pressure.

Figure 14:
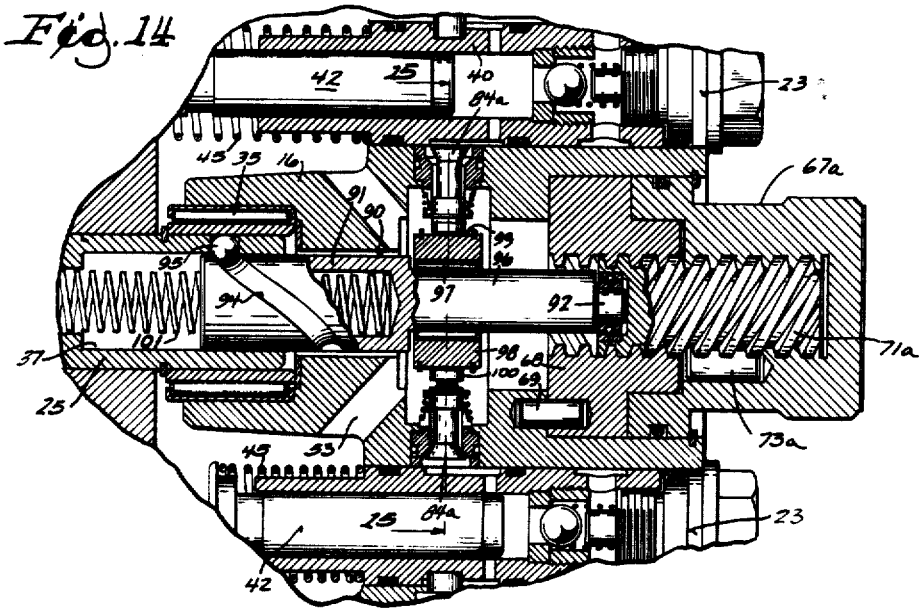
FIGURE 14 is a fragmentary axial cross-sectional view of a pump utilizing a modified form of the invention.
Figure 15:
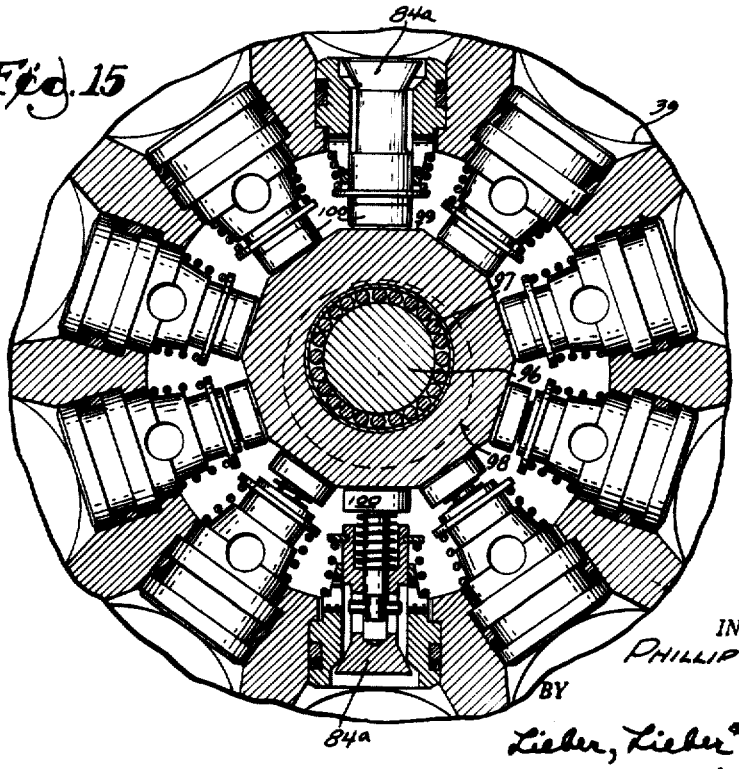
FIGURE 15 is a transverse cross-sectional view taken on line 15—15 of FIGURE 14.

Referring now to the modification shown in FIGURES 14 and 15, parts similar to those in the FIGURE 1 device have similar reference characters. The functioning of this modified form is the same as the FIGURE 1 device but instead of a three dimensional cam, a two dimensional cam is provided, as follows.

An axially shiftable control shaft 90 has a tubular portion 91 mounted within a bore 37 of the drive shaft 25. Shaft 90 is piloted at its other end 92 in the externally threaded member 71a. Member 71a is prevented from turning relative to the control knob 67a, but is axially slidable in respect thereto, by means of the key 73a. A spiral groove 94 is formed on the periphery of the tubular portion 91, and a ball 95 set in the latter engages this groove. The ball and groove constitute a driving connection between the drive shaft 25 and shaft 90.

The shaft 90 also has eccentrically formed portion 96, which forms an eccentric or cam, upon which is rotatably mounted, on anti-friction bearings 97, the multifaced collar 98. The various faces 99 of this collar are engaged by the shoes 100 of the valve element 84a and this collar-shoe arrangement provides particularly good contact between these parts and very smooth valve operation.

The operation of this modified form of the invention is as follows: Turning the control knob 67a causes the member 71a to slide axially, carrying with it the shaft 90. The spring 101 acts to urge the shaft to the right (FIG. 14) when the knob is turned to allow the shaft to move in that direction.

Axial movement of shaft 90 causes it to rotate by the action of ball 95 riding in the spiral groove 94, and this shaft rotation causes the cam or eccentric portion 96 of the shaft 90 to change position relative to the swash plate 44. In other words, the phase of the eccentric in relation to the swash plate may be readily varied by the control knob 67a so as to vary the point during piston travel at which these by-pass valves 84a will open. The timing of the eccentric relative to the beginning of the suction stroke of the pistons 42 may be such as to permit these valves 84a to remain open a short time after commencement of the suction stroke, and thereby function as auxiliary inlets.

Both of the modifications shown, therefore provide a control means by which the opening of the by-pass valves can be readily varied or adjusted in respect to the pumping stroke of the piston and both also may act as auxiliary inlets during a part of the piston suction stroke.

By means of this invention a readily adjustable controlling means is provided for the by-pass valves which is synchronized and properly phased with the piston driving means. Therefore, the proper and efficient operation of the regular inlet valves in the pistons is assured when the by-pass valves act as auxiliary inlet valves. By the specific means of the ball check valves for by-passing fluid, leakage problems have been reduced considerably. Any by-passing of fluid is done at nominal pressures which in itself results in an efficient pumping mechanism with little frictional heat buildup and leakage.

The cam controlling mechanism provided by the present invention actuates the by-pass valves with a smooth action which contributes materially to quiet and trouble-free pump operation, and a hydraulic pump has been provided whose volumetric output is easily adjustable.

Various modes of carrying out the invention are contemplated as being within the scope of the following claims particularly pointing out and distinctly claiming the subject matter which is regarded as the invention.

I claim:

1. In a hydraulic pump of the type having a plurality of cylinders forming pumping chambers, a piston having valve means therein reciprocable in each of said cylinders, means contacting said pistons to reciprocate said pistons in suction and discharge strokes, a fluid supply inlet chamber in fluid communication with said valve means for admitting fluid through said pistons to said pumping chambers during a suction stroke of their respective piston, an outlet port in fluid communication with said pumping chambers through which pressure fluid is dischargeable during a piston discharge stroke, the improvement residing in fluid by-pass means between at least some of said pumping chambers and said inlet chamber for diverting fluid pumped by said pistons during an initial portion of their discharge stroke into said inlet chamber, and means connected and synchronized with said piston reciprocating means to actuate said by-pass means.

2. A hydraulic pump comprising, a plurality of cylinders forming pumping chambers, a piston having valve means therein reciprocable in each of said cylinders, a rotary wobble plate to reciprocate said pistons in suction and discharge strokes, a fluid inlet chamber in fluid communication with said valve means for admitting fluid through said pistons to said pumping chambers during a suction stroke of their respective piston, an outlet port in fluid communication with said pumping chambers through which pressure fluid is dischargeable during a piston discharge stroke, a by-pass valve between said pumping chambers and said inlet chamber, for diverting fluid pumped by said pistons into said inlet chamber, and means synchronized with said wobble plate to actuate said by-pass valves.

3. A hydraulic pump comprising, a plurality of cylinders forming pumping chambers, a piston having valve means therein reciprocable in each of said cylinders, a rotatable wobble plate means to reciprocate said pistons in suction and discharge strokes, a fluid inlet chamber in fluid communication with said valve means for admitting fluid through said pistons to said pumping chambers during a suction stroke of their respective piston, an outlet port in fluid communication with said pumping chambers through which pressure fluid is dischargeable during a piston discharge stroke, fluid by-pass means between said pumping chambers and said inlet chamber for diverting fluid pumped by said pistons into said inlet chamber, and a rotary cam secured to said wobble plate means for rotation therewith to actuate said by-pass means.

4. A hydraulic pump comprising, a plurality of cylinders forming pumping chambers, a piston having valve means therein reciprocable in each of said cylinders, means engageable with said pistons to reciprocate said pistons in suction and discharge strokes, a fluid inlet chamber in fluid communication with said valve means for admitting fluid through said pistons to said pumping chambers during a suction stroke of their respective piston, an outlet port in fluid communication with said pumping chambers through which pressure fluid is dischargeable during a piston discharge stroke, a valve between said pumping chambers and said inlet chamber for diverting fluid pumped by said pistons into said inlet chamber, and means synchronized with said piston reciprocating means to open said valves during a portion of its corresponding piston's discharge stroke and also during said piston's suction stroke.

5. A hydraulic pump comprising, a plurality of cylinders forming pumping chambers, a piston having valve means therein reciprocable in each of said cylinders, means contacting said pistons to reciprocate said pistons in suction and discharge strokes, a fluid inlet chamber in fluid communication with said valve means for admitting fluid through said pistons to said pumping chambers during a suction stroke of their respective piston, an outlet port in fluid communication with said pumping chambers through which pressure fluid is dischargeable during a piston discharge stroke, a valve between said pumping chambers and said inlet chamber for diverting fluid pumped by said pistons into said inlet chamber, and a rotary cam secured to said piston reciprocating means for rotation therewith to open said valves.

6. A hydraulic pump comprising, a plurality of cylinders forming pumping chambers, a piston having valve means therein reciprocable in each of said cylinders, means engaging said pistons to reciprocate said pistons in suction and discharge strokes, a fluid inlet chamber in fluid communication with said valve means for admitting fluid through said pistons to said pumping chambers during a suction stroke of their respective piston, an outlet port in fluid communication with said pumping chambers through which pressure fluid is dischargeable during a piston discharge stroke, a valve between said pumping chambers and said inlet chamber for diverting fluid pumped by said pistons into said inlet chamber, a rotary cam secured to said piston reciprocating means for rotation therewith to open said valves, and adjustable control means for shifting said cam to vary the length of time during the piston discharge stroke in which said valves are open.

7. A hydraulic pump comprising, a plurality of cylinders forming pumping chambers, a piston having valve means therein reciprocable in each of said cylinders, means contacting said pistons to reciprocate said pistons in suction and discharge strokes, a fluid inlet chamber in fluid communication with said valve means for admitting fluid to said pumping chambers during a suction stroke of their respective piston, an outlet port in fluid communication with said pumping chambers through which pressure fluid is dischargeable during a piston discharge stroke, a valve between said pumping chambers and said inlet chamber for diverting fluid pumped by said pistons into said inlet chamber, an eccentric member secured to said piston reciprocating means for rotation therewith to open said valves, and adjustable control means for rotationally shifting said member in respect to said piston reciprocating means to vary the length of time during the piston discharge stroke in which said valves are open.

8. A hydraulic pump comprising a plurality of cylinders forming pumping chambers, a piston having valve means therein reciprocable in each of said cylinders, means contacting said pistons to reciprocate said pistons in suction and discharge strokes, a fluid inlet chamber in fluid communication with said valve means for admitting fluid to said pumping chambers during a suction stroke of their respective piston, an outlet port in fluid communication with said pumping chambers through which pressure fluid is dischargeable during a piston discharge stroke, a valve between said pumping chambers and said inlet chamber for diverting fluid pumped by said pistons into said inlet chamber, a control shaft secured to said piston reciprocating means for rotation therewith, an eccentric on said control shaft and adapted to actuate said valves, means forming an adjustable connection between said control shaft and said piston reciprocating means to permit axial shifting of the former and thereby changing of the rotational phase between said eccentric and said piston reciprocating means, and means to axially shift said control shaft.

*9. A hydraulic pump comprising a housing, a plurality of cylinders within said housing forming pumping chambers, a piston reciprocable in each of said cylinders, a rotatable cam plate to reciprocate said pistons in suction and discharge strokes, a fluid inlet chamber for admitting fluid to said pumping chambers during a suction stroke of their respective pistons, an outlet port in fluid communication with a plurality of said pumping chambers through which pressure fluid is dischargeable during a piston discharge stroke, fluid by-pass means between said pumping chambers and said inlet chamber for diverting fluid pumped by said pistons into said inlet chamber, means for rotation with said rotatable cam to actuate said by-pass means, said pump housing being formed with at least one fluid opening in axial alignment with at least one of said pumping chambers, fluid isolating means insertable through said opening in fluid communication with said last mentioned chamber providing a second outlet port whereby fluid from at least one of said pumping chambers may be discharged through said second outlet port.*

*10. A hydraulic pump comprising, a pump housing, a plurality of cylinders within said housing forming pumping chambers, a piston having valve means therein reciprocable in each of said cylinders, a rotatable wobble plate means to reciprocate said pistons in suction and discharge strokes, a fluid inlet chamber in fluid communication with said valve means for admitting fluid through said pistons to said pumping chambers during a suction stroke of their respective pistons, an outlet port in fluid communication with a plurality of said pumping chambers through which pressure fluid is dischargeable during a piston discharge stroke, fluid by-pass means between said pumping chambers and said inlet chamber for diverting fluid pumped by said pistons into said inlet chamber, and a rotary cam secured to said wobble plate means for rotation therewith to actuate said by-pass means, said housing being formed with at least one fluid isolating opening in axial alignment with at least one of said pumping chambers, fluid isolating means insertable through said opening in fluid communication with said last mentioned chamber providing a second outlet port whereby fluid from at least one of said pumping chambers may be discharged through said second outlet port.*

*11. A hydraulic pump comprising, a pump housing, a plurality of cylinders in said housing forming pumping chambers, a piston reciprocable in each of said cylinders, means engaging said pistons to reciprocate said pistons in suction and discharge strokes, a fluid inlet chamber for admitting fluid to said pumping chambers during suction strokes of their respective pistons, an outlet port in fluid communication with said pumping chambers through which pressure fluid is dischargeable during a piston discharge stroke, isolating means extending into said housing in fluid communication with at least one of said pumping chambers to divert the fluid flow therefrom to thereby form a second outlet, a valve between each of said pumping chambers and said inlet chamber for returning fluid pumped by said pistons into said inlet chamber, means to open said valves, and an adjustable control for controlling said last-mentioned means to vary the length of time during the piston discharge stroke in which said valves are open, whereby a pump is provided having more than one output and each of said outputs depending on the setting of said adjustable control.*

(References on following page)

References Cited by the Examiner

The following references, by the Examiner, are of record in the patented file of this patent or the original patent.

UNITED STATES PATENTS

| | | | |
|---|---|---|---|
| 709,929 | 9/02 | Raven. | |
| 718,132 | 1/03 | Lamplough. | |
| 906,022 | 12/08 | Hesselman. | |
| 1,336,803 | 4/20 | Woerner. | |
| 1,416,731 | 5/22 | Martin. | |
| 1,768,102 | 6/30 | Bellem. | |
| 1,895,259 | 1/33 | Muller. | |
| 1,909,961 | 5/33 | Hofmann. | |
| 1,952,154 | 3/34 | Atteslander. | |
| 1,990,263 | 2/35 | Benedek. | |

| | | | |
|---|---|---|---|
| 2,006,879 | 7/35 | Benedek. | |
| 2,093,477 | 9/37 | Parsons. | |
| 2,142,086 | 1/39 | Alden. | |
| 2,213,994 | 9/40 | Rankin. | |
| 2,300,313 | 10/42 | Pool. | |
| 2,357,563 | 9/44 | Truxell | 103—41.2 |
| 2,417,137 | 3/47 | Smith | 103—41.2 |
| 2,453,402 | 11/48 | Bell. | |
| 2,474,396 | 6/49 | Groves. | |
| 2,664,048 | 12/53 | Huber. | |

FOREIGN PATENTS

| | | |
|---|---|---|
| 496,546 | 4/18 | France. |

LAURENCE V. EFNER, *Primary Examiner.*